United States Patent
Hiser

(10) Patent No.: US 7,198,060 B2
(45) Date of Patent: Apr. 3, 2007

(54) PRESSURE RELIEVING COUPLER MANIFOLD WITH INTERNAL VELOCITY FUSE

(75) Inventor: Nicholas R. Hiser, Lincoln, NE (US)

(73) Assignee: Parker-Hannifin Corporation, Cleveland, OH (US)

( * ) Notice: Subject to any disclaimer, the term of this patent is extended or adjusted under 35 U.S.C. 154(b) by 48 days.

(21) Appl. No.: 11/122,697

(22) Filed: May 5, 2005

(65) Prior Publication Data

US 2005/0247359 A1    Nov. 10, 2005

Related U.S. Application Data

(60) Provisional application No. 60/568,200, filed on May 5, 2004.

(51) Int. Cl.
*F15B 13/042* (2006.01)

(52) U.S. Cl. .................. 137/495; 137/509; 137/614.03

(58) Field of Classification Search ................ 137/495, 137/509, 614.03
See application file for complete search history.

(56) References Cited

U.S. PATENT DOCUMENTS

| | | | |
|---|---|---|---|
| 1,397,912 A | 11/1921 | Wishart et al. | |
| 3,653,405 A | 4/1972 | Nelson | |
| 4,210,168 A * | 7/1980 | Yonezawa | 137/454.5 |
| 4,491,157 A | 1/1985 | Hashimoto | |
| 4,624,444 A * | 11/1986 | Johnson | 251/121 |
| 4,860,788 A * | 8/1989 | Asaoka | 137/491 |
| 4,865,079 A * | 9/1989 | Martin et al. | 137/879 |
| 6,116,277 A | 9/2000 | Wilcox et al. | |
| 6,477,937 B1 | 11/2002 | Horn et al. | |
| 6,758,238 B2 * | 7/2004 | Callies | 137/495 |
| 6,840,276 B2 | 1/2005 | Zeiber et al. | |
| 2003/0201017 A1 | 10/2003 | Knuthson | |

\* cited by examiner

*Primary Examiner*—John Fox
(74) *Attorney, Agent, or Firm*—Renner, Otto, Boisselle & Sklar, LLP

(57) ABSTRACT

A decompression valve assembly is normally open thereby allowing thermal pressure build-up in an auxiliary circuit to be dissipated via a bleed path. During operation, the bleed path is sealed by a check valve, whereby high pressure flow can be fully directed to the work tool powered by the auxiliary circuit, for high system efficiency. In addition, a velocity fuse feature limits the rate of flow to the bleed path, thereby to allow for controlled release of pressure from the auxiliary circuit, as is desirable to protect against a rapidly falling load.

15 Claims, 8 Drawing Sheets

PRESSURE RELIEVING COUPLER MANIFOLD WITH INTERNAL VELOCITY FUSE

RELATED APPLICATION

This application claims the benefit of U.S. Provisional Application No. 60/568,200 filed May 5, 2004, which is hereby incorporated herein by reference.

FIELD OF THE INVENTION

The present invention relates generally to fluidic systems and more particularly to a quick-disconnect coupler manifold including a decompression valve assembly for relieving pressure from pressure lines for facilitating coupling of, for example, auxiliary hydraulic system components.

BACKGROUND OF THE INVENTION

A trend in the construction industry has been to utilize smaller, more versatile machinery on the job-site. For example, mini-excavators and skid-steer loaders are often used to perform a variety of tasks. In many cases, a skid-steer loader or mini-excavator is equipped with an attachment for performing a particular task. Such attachments are typically powered by an auxiliary hydraulic circuit on the skid-steer loader or mini-excavator. Numerous attachments exist for performing a variety of tasks. For example, attachments exist for allowing a skid-steer loader to be used as a backhoe, an earth auger, an angle broom, a drop hammer, a snowplow, a brush saw, etc. These attachments typically are designed to be quickly connected and disconnected from the skid-steer loader or other machine by an operator on the job-site. The ability to quickly change attachments on the job-site makes these smaller machines more versatile than larger machines.

Quick-disconnect couplers are often used to allow quick and convenient connection and disconnection of hydraulic lines of an attachment to the auxiliary hydraulic circuit of the machinery. These types of couplers also are often used on construction equipment or agricultural tractors for connecting auxiliary circuits that power work tools or pull behind implements. The couplers are frequently housed in valve stacks or banks on the machinery in a position that is easily accessible to the operator when connecting an attachment. As such, the couplers are generally in close proximity of each other.

In general, an operator manually connects the hydraulic lines of an attachment to the auxiliary hydraulic circuit of the machine. To form the connection, a plug-like coupler part and a socket like coupler part are customarily used to couple the supply/return lines. In many instances, the connection is made while internal hydraulic pressure exists in one or both of the lines to be connected. Such internal hydraulic pressure can be residual hydraulic pressure from operating the attachment, or may be due to thermal hydraulic pressure buildup in the hydraulic circuit. Regardless, hydraulic pressure in the circuit can make forming the connection more difficult, especially with standard quick-disconnect couplers.

The ability of a coupler to connect and disconnect as intended to another coupler or fitting can be highly dependent on the system within which it operates, and specifically, the flow and pressure potential within the coupler. Many couplers have internal valves that are biased closed by internal hydraulic pressure when the coupler is not connected to another coupler or fitting. Once the coupler is connected to another coupler or fitting, the internal valve is opened allowing flow therethrough. For the user, it becomes increasingly difficult to make a connection as internal pressure, and thus hydraulic force, on the valves of the two couplers to be connected increases. In the hydraulic coupling industry, difficulty in making a connection due to hydraulic pressure is known as the "connect under pressure" problem.

Hydraulic pressure within a coupling is essentially a form of trapped energy. Thus, in order to connect a coupling under pressure, the trapped energy must be dissipated or otherwise managed. In general, this means that the energy within the coupling must be dissipated during the connection, or must be moved or contained in a place where its effects are minimized.

The majority of couplers capable of connecting under pressure do so by dissipating the internal hydraulic energy by allowing the hydraulic fluid (e.g. oil) to expand prior to connection. Some couplers have internal bleed valves that let the oil expand to a low-pressure line within the hydraulic system. Other couplers are designed with an internal bleed valve that lets the oil expand into and through the mating coupler. Still other couplers incorporate a mechanism for providing a mechanical advantage to generate enough force to overcome the hydraulic forces acting on the valves. And still other couplers have an external bleed valve that lets the hydraulic fluid expand external to the system, i.e., into the environment.

Many prior art coupler designs providing connect under pressure functionality have specialized internal valving that provides the connect under pressure functionality. Such couplers are more complex and cost more than a standard coupler (i.e., couplers without internal valving) due to the internal valving. Further, many prior art coupler designs utilize elastomeric seals that are required to throttle flow during connect under pressure. It is well known that throttling flow over elastomeric seals increases the potential for seal damage and often results in such. Many prior art coupler designs also involve the need for operator training as the operation of the couplers is not intuitive.

SUMMARY OF THE INVENTION

The present invention provides a quick coupling system with a novel decompression valve assembly that, when actuated, allows internal hydraulic pressure in the couplers and/or the hydraulic circuit to be released in a uniquely controlled manner. Unlike prior art decompression valves used in coupler manifolds for quick coupling systems, the decompression valve assembly of the present invention is configured to automatically close under certain conditions, such as in the event of a sudden surge flow.

More particularly, the decompression valve assembly is normally open thereby allowing thermal pressure build-up in an auxiliary circuit to be dissipated via a bleed path. During operation, the bleed path is sealed by a check valve, whereby high pressure flow can be fully directed to the work tool powered by the auxiliary circuit, for high system efficiency. In addition, a velocity fuse feature limits the rate of flow to the bleed path, thereby to allow for controlled release of pressure from the auxiliary circuit, as is desirable to protect against a rapidly falling load.

Consequently, principles of the present invention can be applied to avoid one or more drawbacks associated with prior art quick coupling systems, including the elimination of the need for connect under pressure couplers that contain specialized internal valving, thereby allowing the use of standard couplers; the elimination or reduction of thermal pressure buildup in the auxiliary circuits; the elimination of the need for elastomeric seals previously required in some systems to throttle flow, and others.

Accordingly, the present invention provides a quick coupling system comprising a fluid circuit including a quick coupling, and a decompression valve assembly that, when actuated, allows internal hydraulic pressure in the fluid circuit to be released to a bleed path, wherein the decompression valve assembly is normally open thereby allowing thermal pressure build-up in the fluid circuit to be dissipated to the bleed path, the decompression valve assembly is closed by high pressure flow in the fluid circuit, and the decompression valve assembly includes a velocity fuse that limits the rate of flow to the bleed path, thereby to provide for controlled decompression of the auxiliary circuit.

According to another aspect of the invention, a coupling system comprises at least one high pressure flow passage; a bleed passage; a check valve that when open and closed respectively permits and blocks flow of fluid from the high pressure flow passage through the bleed passage; and an actuator normally biased to a valve open position at which the actuator prevents the check valve from closing, and the actuator being movable to a valve closed position allowing the check valve to close when pressure in the bleed passage exceeds a valve close level.

In a preferred embodiment, the actuator is manually operable, as by means of a push button, to open the check valve when held closed by pressure in the high pressure flow passage. A flow restrictor, such as an orifice, may be provided in the bleed passage downstream of the check valve for restricting flow through the bleed passage and for generating back pressure upstream of the flow restrictor, which back pressure acts on the actuator to move it valve closed position in response to the back pressure exceeding the valve close level.

More particularly, the check valve may have a valve seat and a valve sealing member for sealing against the valve seat, and the actuator may include an axially movable plunger resiliently biased from a valve closed position allowing the valve sealing member to seal against the valve seat to a valve open position displacing the valve sealing member away from the valve seat thereby to allow flow of fluid through the check valve. The plunger may be resiliently biased by a first biasing force from its valve closed position to its valve open position, and the valve sealing member may be resiliently biased by a second, lower, biasing force towards the valve seat, whereupon the check valve is normally open. Preferably, the high pressure flow passage, bleed passage, check valve, actuator and flow restrictor are located in a manifold block to which quick-disconnect couplers can be attached for enabling connection to respective coupler halves of auxiliary equipment.

According to a further aspect of the invention, a coupling system comprises first and second coupler halves configured to connect with respective mating coupler halves; a chamber connecting at least one of the first and second coupler halves to a drain line coupler; and a decompression valve assembly configured to control flow from the chamber to the drain line coupler. The decompression valve assembly includes a check valve that when open and closed respectively permits and blocks flow of fluid from the respective coupler half to the drain line coupler, an orifice downstream of the check valve for metering flow from the chamber to the drain line coupler, and an open biased plunger configured to force open the check valve when in a valve open position, and to automatically shift to a valve closed position when pressure in the chamber exceeds a predetermined level.

In a preferred embodiment the check valve is a hard seat check valve, and the plunger is manually movable, as by means of a push button, from its valve closed position to its valve open position.

According to a still further aspect of the invention, a quick coupling system for enabling quick connect/disconnect of auxiliary equipment to high pressure supply/return lines, comprises first and second high pressure flow lines and respective quick-disconnect coupler halves configured for quick connect/disconnect with mating coupler halves associated with the auxiliary equipment; a low pressure flow passage; a chamber connecting at least one of the high pressure flow lines to the low pressure flow passage; and a decompression valve assembly having open and closed states respectively permitting and blocking fluid flow from the chamber to the low pressure flow passage, the decompression valve assembly including a velocity fuse for closing the decompression valve assembly when flow through the decompression valve assembly exceeds a predetermined level.

In a preferred embodiment, the velocity fuse includes a flow restrictor for throttling fluid flow from the chamber to the low pressure flow passage. As before, decompression valve may include a valve seat, a valve sealing member for sealing against the valve seat, and a plunger resiliently biased from a valve closed position allowing the valve sealing member to seal against the valve seat to a valve open position displacing the valve sealing member away from the valve seat thereby to allow flow of fluid through the decompression valve assembly, with the plunger being responsive to back pressure upstream of the orifice for movement of the plunger against the biasing force to its valve open position when the back pressure is high enough to overcome the biasing force acting on the plunger. Again, the decompression valve assembly may include a device for manually moving the plunger from its valve closed position to its valve open position, and the chamber may connect both of the high pressure flow passages to the low pressure flow passage via the decompression valve assembly.

The foregoing and other features of the invention are more particularly described in the following detailed description when considered in conjunction with the drawings.

DETAILED DESCRIPTION

Figure 1:
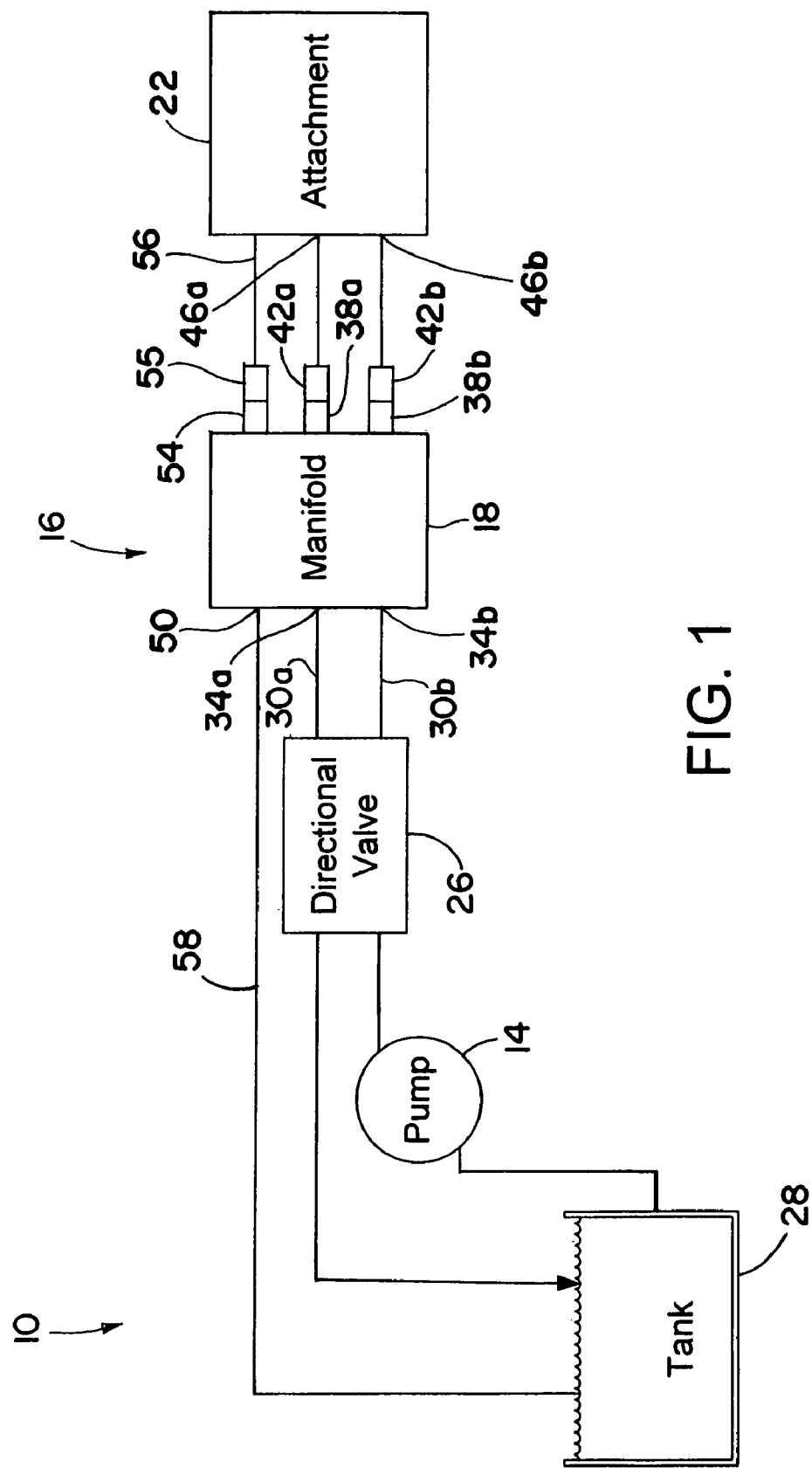
FIG. 1 is a schematic diagram illustrating an auxiliary hydraulic circuit including a coupler manifold having a decompression valve assembly in accordance with the present invention.

Referring now to the drawings in detail, and initially to FIG. 1, an exemplary hydraulic circuit 10 generally comprises a pump 14, a coupler system 16, and an attachment 22. In the illustrated embodiment, which is particularly suited for use in a mini-excavator, skid-steer loader, or similar type of machinery, there is a directional control valve 26 that directs pressurized fluid from the pump 14, which draws fluid from a tank 28, to either hydraulic line 30a or 30b depending on the desired direction of operation of the attachment 22. Hydraulic lines 30a and 30b are connected to the coupler system 16 which includes a manifold 18. More particularly, the lines 30a and 30b are connected to manifold ports 34a and 34b, respectively. Manifold ports 34a and 34b are connected internally via the manifold 18 to manifold coupler halves 38a and 38b, respectively.

In the illustrated embodiment, coupler half 38a is a male coupler half and coupler half 38b is a female coupler half, this being in accordance with conventional practice. Mating attachment coupler halves 42a and 42b connect hydraulic lines 46a and 46b of the attachment 22 to the manifold coupler halves 38a and 38b. A motor case drain port 50 in the manifold 18 is connected internally with a motor case drain line coupler half 54. The motor case drain line coupler half 54 is coupled to a mating motor case drain line coupler half 55 and motor case drain line 56.

The motor case drain port 50 is connected to the tank 28 via line 58. As will be described in further detail herein, the motor case drain port 50 also is connected internally with the coupler manifold ports 34a and 34b and coupler halves 38a and 38b for releasing pressure from the system 10.

In operation, the pump 14 provides pressurized fluid from the tank 28 to the directional control valve 26. Depending on the desired direction of operation, the directional control valve 26 directs the pressurized fluid to either hydraulic line 30a or 30b. By directing the fluid to one or the other of the hydraulic lines 30a and 30b the direction of operation of the attachment 22 can be reversed. Thus, either hydraulic line 30a or 30b can supply fluid to the attachment 22 while the other hydraulic line not supplying fluid acts as a return line to return the fluid to the tank 28. The motor case drain is provided for use with auxiliary equipment that require a low pressure return, such as for draining fluid from a motor case in the auxiliary equipment. However, as will become apparent from the following description, the motor case drain port 50 and line 58 serve a further function of providing a low pressure return path to the tank 28 for fluid bled from the high pressure flow lines by means of the herein described decompression valve assembly. Consequently, the port 50 is herein also referred to as a release, bleed or vent port, and although undesired, the port 50 could be open to the atmosphere or otherwise, as long as a path is provided for bleed flow from the manifold 18.

As previously mentioned, a common practice is to use a variety of interchangeable attachments 22 with an auxiliary hydraulic system 10 of a skid-steer loader or similar type of machinery. Thus, the manifold 18 of the auxiliary hydraulic system 10, which functions as a coupling system, provides a convenient interface for changing attachments 22 by providing a single location for connecting and disconnecting the hydraulic lines of the attachment 22 to the auxiliary hydraulic system 10. Residual pressure, however, often remains in the system 10 after an attachment 22 is operated, and this can make it difficult to disconnect and/or connect the attachment 22. Further, thermal pressure buildup in the attachment 22 and/or auxiliary hydraulic system 10 can be an impediment to connecting an attachment 22. As previously noted, pressure relieving couplers can be used to allow connection under pressure, or the pressure might be relieved to the environment. However, pressure-relieving couplers can be costly and may require operator training, and relieving the pressure to the environment is usually not a viable option.

In accordance with the present invention and with reference to FIGS. 2–6, the manifold 18 further includes decompression valve assembly 62. In the illustrated embodiment, the decompression valve assembly 62 includes a push-button 64 (or other manually manipulable device) for manually opening the decompression valve assembly 62 to allow any internal hydraulic pressure in the high pressure circuits to be released to the motor case drain port 50 and line 58 for return to the tank 28. The decompression valve assembly 62 allows standard couplers to be used without the aforementioned difficulties of connecting under pressure with such couplers. Further, once the pressure in the system 10 is released, the decompression valve assembly 62 remains open thereby continually venting the system 10 and preventing pressure buildup. The decompression valve assembly 62 further includes a velocity fuse that automatically closes the decompression valve assembly 62 when flow through the decompression valve assembly 62 exceeds a predetermined level.

Figure 2:
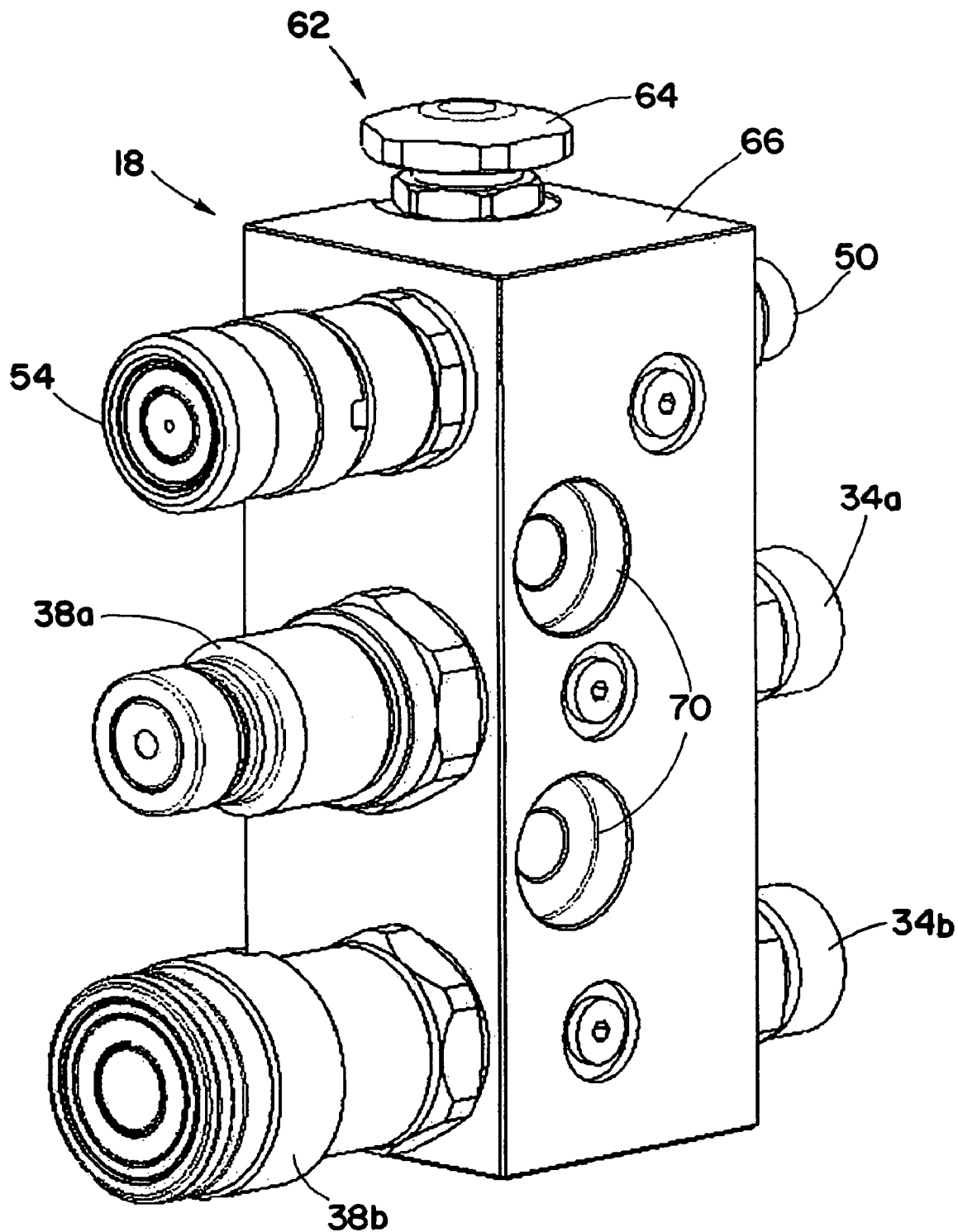
FIG. 2 is a perspective view of a coupler manifold including a decompression valve assembly according to the present invention.
Figure 3:
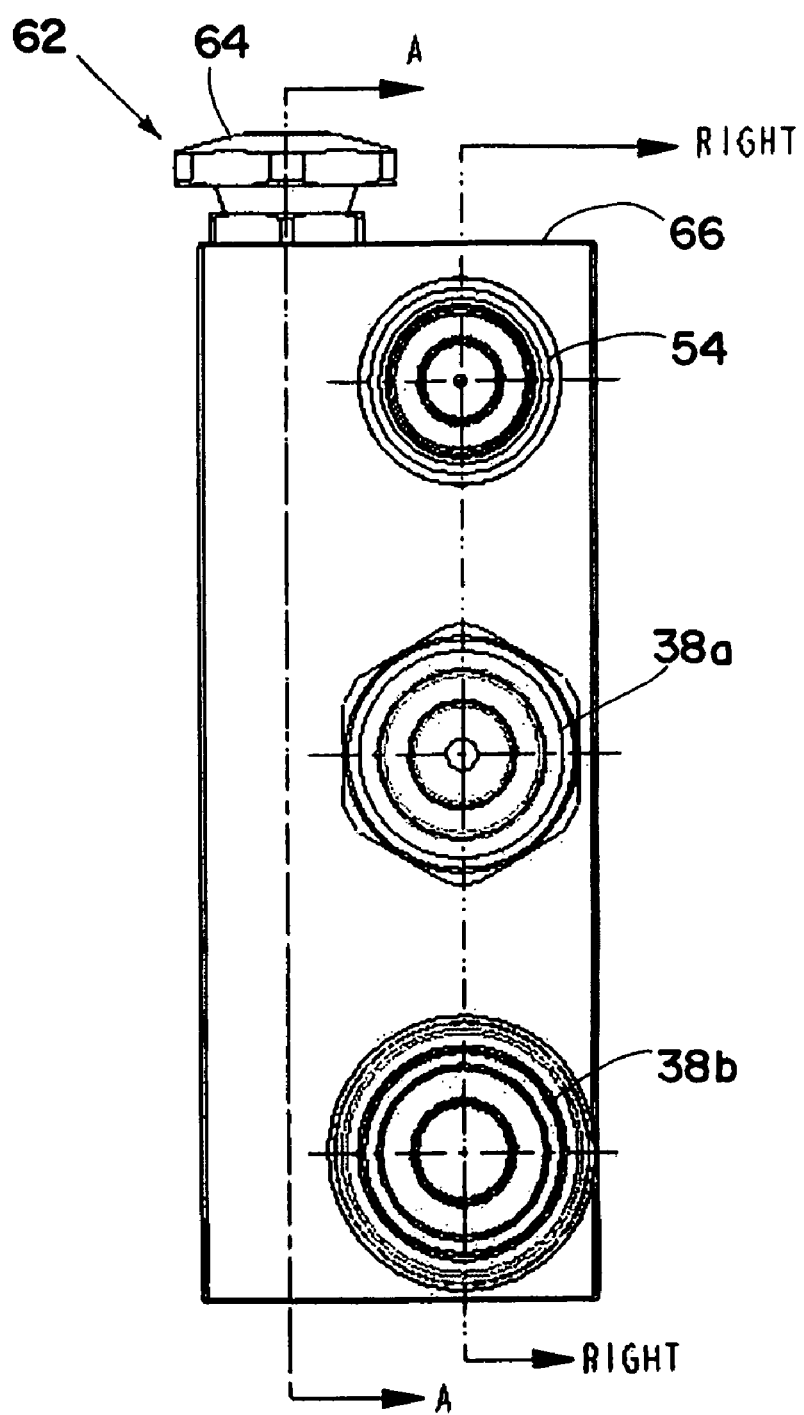
FIG. 3 is a front view of the coupler manifold of FIG. 2 according to the present invention.
Figure 4:
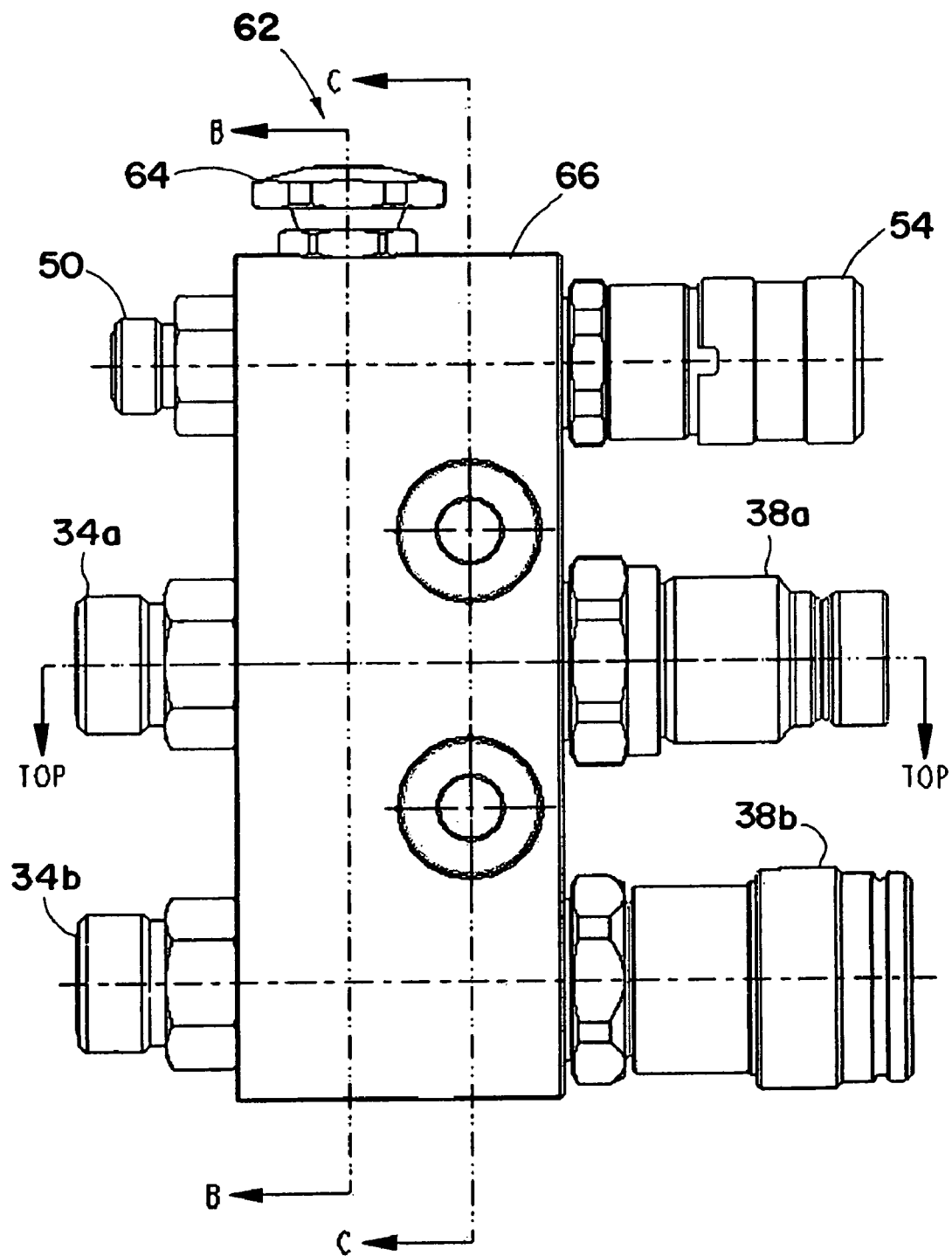
FIG. 4 is a side view of the coupler manifold of FIG. 2 according to the present invention.

Referring to FIGS. 2–4, the illustrated manifold 18 includes a manifold body 66 (or block) that, as shown, may be provided with mounting holes 70 for securing the manifold 18 to machinery, such as a skid-steer loader, mini-excavator, or other equipment. The manifold block 66 has attached thereto the two auxiliary circuit coupler halves 38a and 38b for coupling to mating coupler halves on the hydraulic lines of the attachment. As desired and conventional, the manifold coupler halves 38a and 38b can be male and female, although they could be both male or both female. The coupler halves 38a and 38b can be of any suitable type, such as quick-disconnect couplers.

The male and female coupler halves 38a and 38b are connected internally via flow passages in the manifold body 66 to the auxiliary hydraulic system manifold flow ports 34a and 34b which can be connected to the hydraulic lines of an auxiliary hydraulic system. The motor case drain line coupler half 54 is connected internally via flow passages to the pressure bleed port 50.

Figure 5:
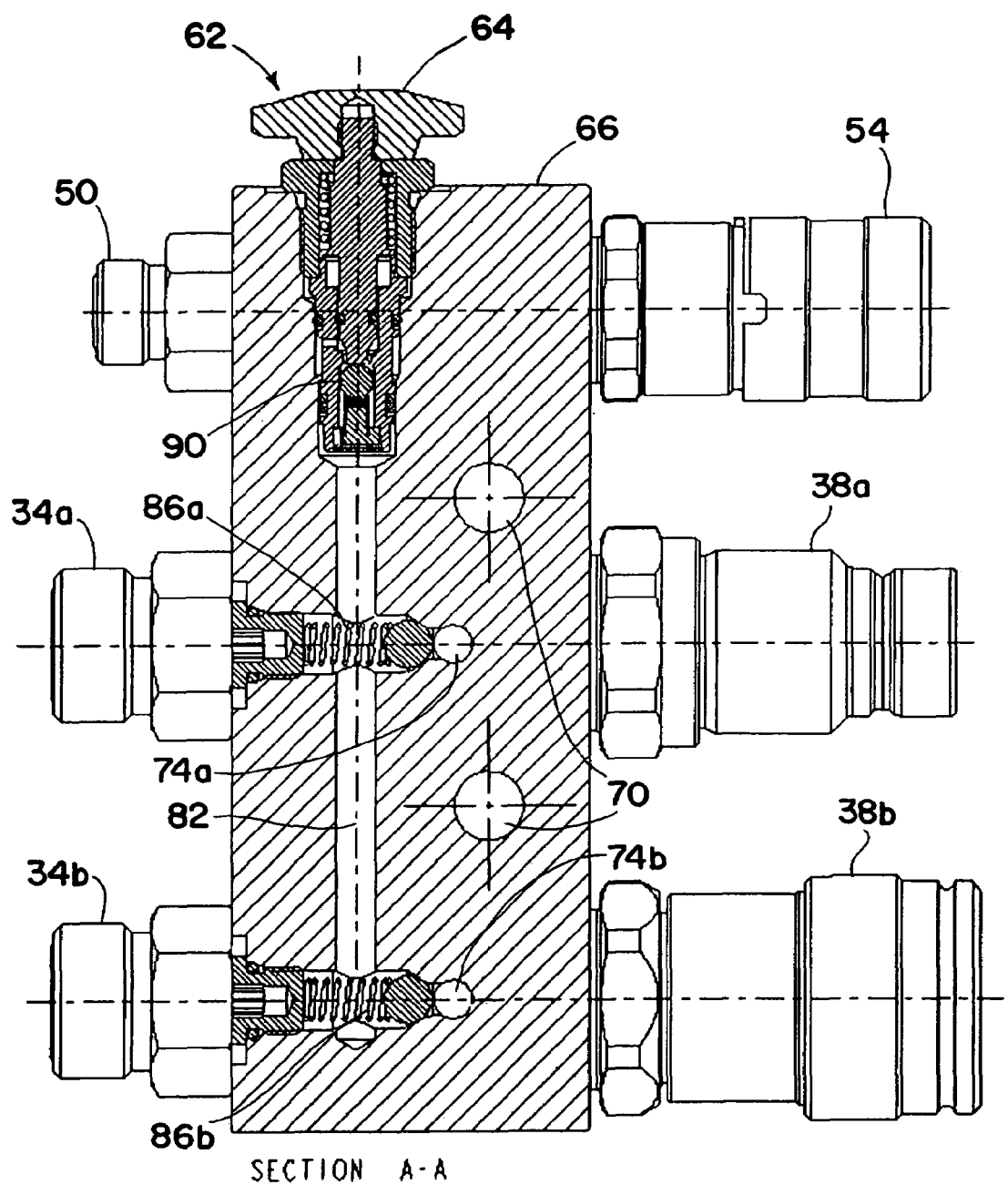
FIG. 5 is a cross-sectional view of the coupler manifold of FIG. 3 taken along the line A—A.
Figure 6:
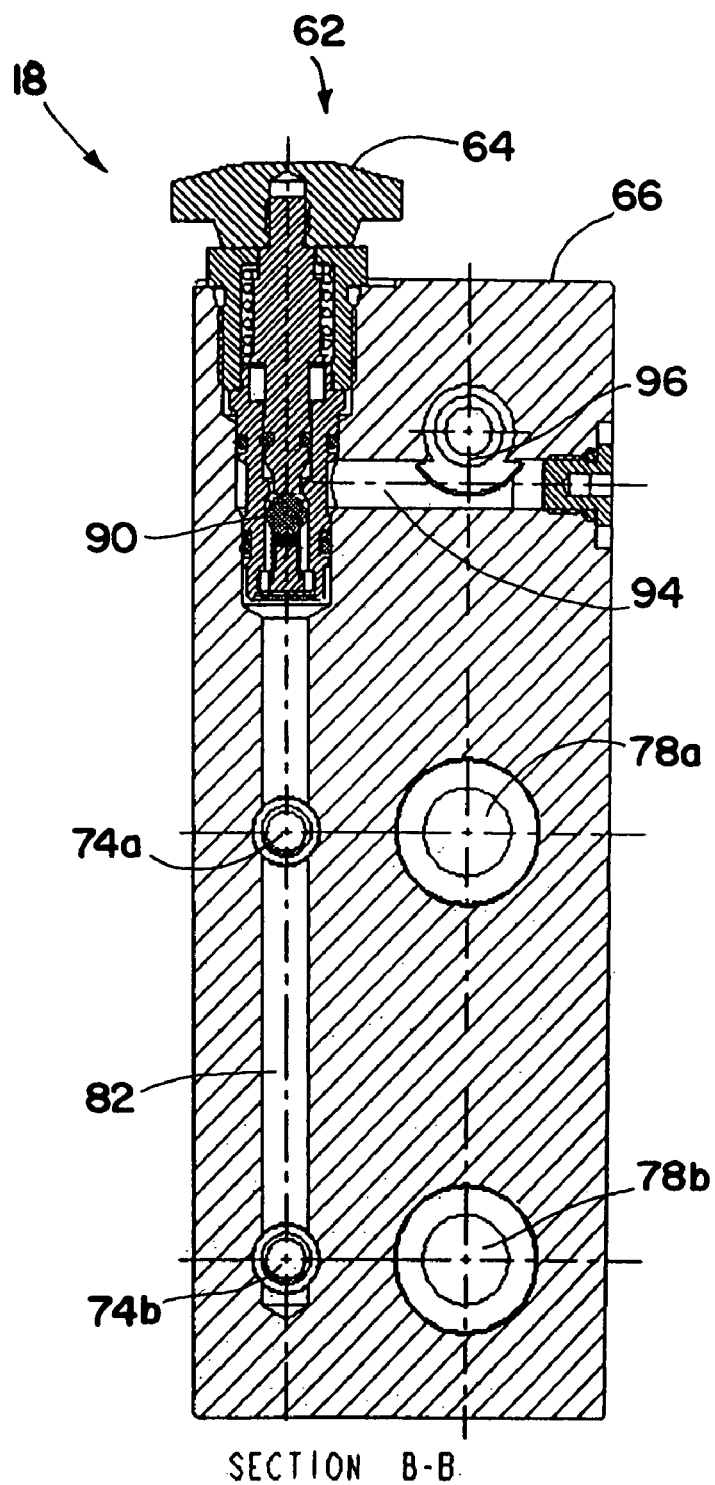
FIG. 6, is a cross-sectional view of the coupler manifold of FIG. 4 taken along the line B—B.

Although separate decompression valve assemblies 62 could be provided to release pressure separately from each of the high pressure flow lines, as seen in FIGS. 5 and 6, pilot pressure ports 74a and 74b interconnect passages 78a and 78b with a common chamber 82 facilitating the use of a single decompression valve assembly 62 to release pressure from both high pressure passages 78a and 78b. To prevent cross-flow between the high pressure passages 78a and 78b, the common chamber 82 is sealed from the passages 78a and 78b by hard seat check valves 86a and 86b that block flow from the common chamber 82 back into the passages 78a and 78b.

Figure 7:
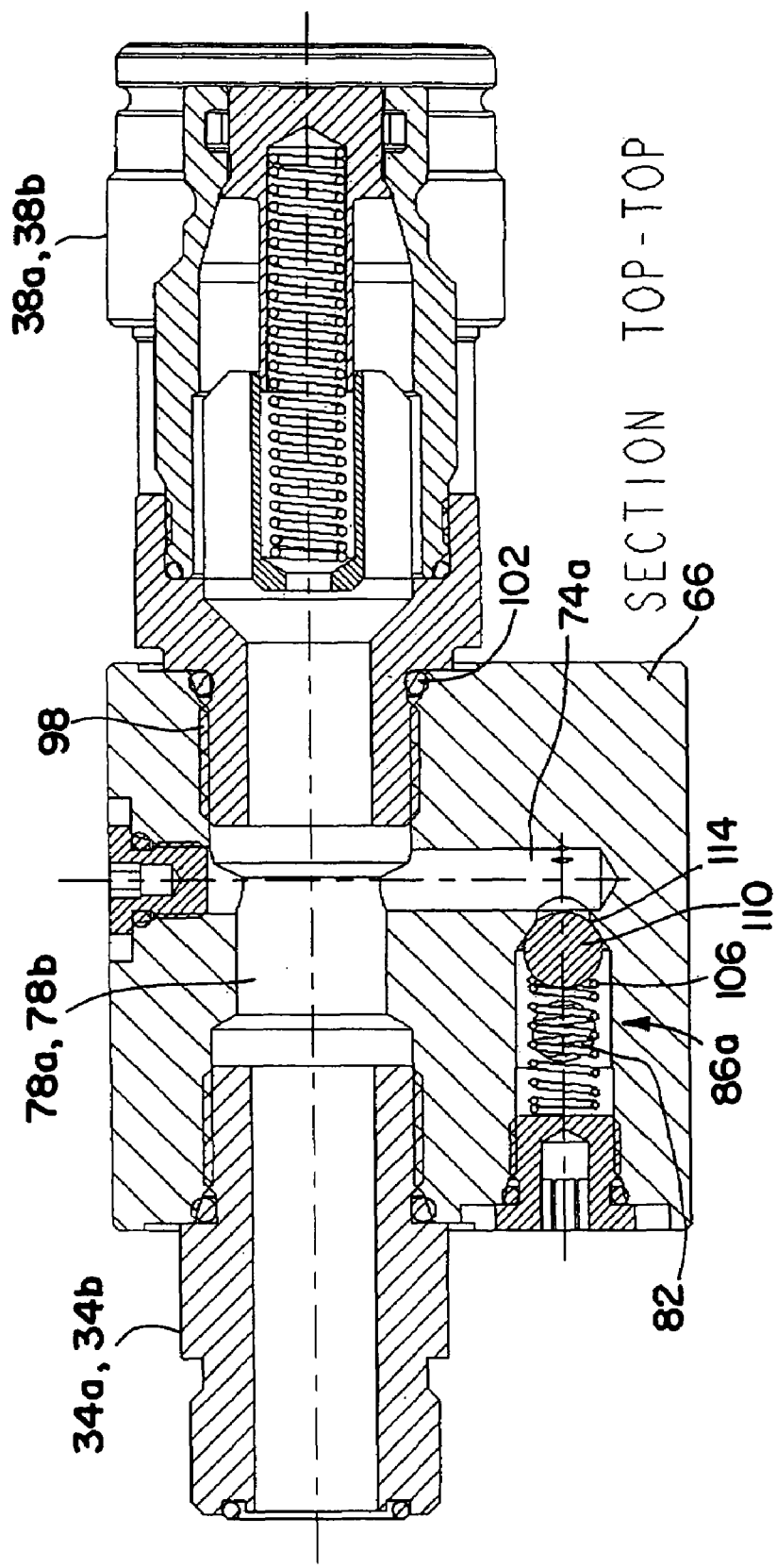
FIG. 7 is a cross-sectional view of the coupler manifold of FIG. 4 taken along the line TOP—TOP.

Turning to FIG. 7, the interconnection of the manifold coupler halves 38a and 38b, passages 74a and 74b, and auxiliary circuit manifold ports 34a and 34b with the common chamber 82 will be described. It will be appreciated that this description is equally applicable to the interconnection of either set of such elements with the common chamber 82. In FIG. 7, the male coupler half 38a is shown connected to the manifold body 66. The male coupler half 38a can be provided with threads 98 on an outer circumference thereof and can be screwed into mating threads of the passage 78a for attachment thereto. A sealing member 102, such as an O-ring, can be provided to ensure a proper seal between the male coupler half 38a and the manifold body 66. Pilot pressure port 74a extends perpendicularly from the passage 78a and connects the passage 78a to check valve 86a. The check valve 86a includes a valve chamber 106, a sealing member 110, and valve seat 114. The check valve chamber 106 connects the pilot pressure port 74a to the common chamber 82. As mentioned, the check valve 86a blocks flow from the common chamber 82 back into the pilot pressure port 74a to prevent excess pressure in the common chamber 82 from entering the passage 78a. However, the check valve 86a allows excess pressure in the passage 78a to be released to the common chamber 82 and ultimately to the tank 28 via the motor case drain port 50 and line 58.

As shown in FIG. 6, the decompression valve assembly 62 is located in an upper portion of the common chamber 82. As discussed further below, the decompression valve assembly 62 has a push button 64 that can be depressed to bleed off pressure from the chamber 82 through a bleed passage 94. The bleed passage 94 is connected to a passage 96 that connects the motor case drain port 50 to the motor case drain line coupler half 54.

Figure 9:
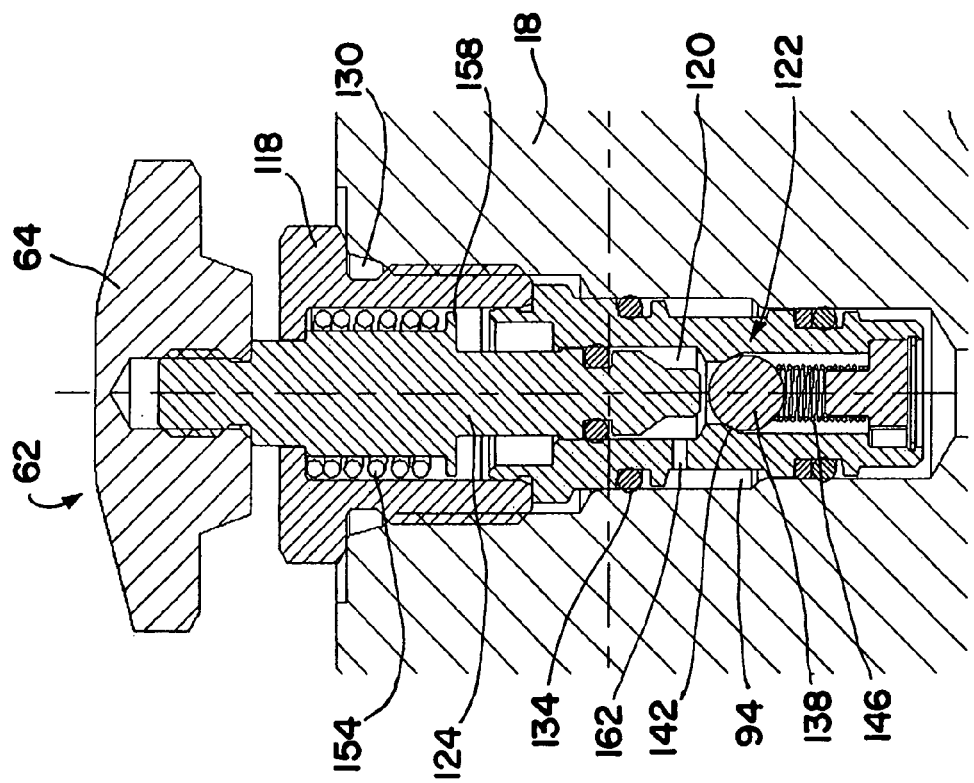
FIG. 9 is a cross-sectional view of the decompression valve assembly in the closed position according to the present invention.
Figure 8:
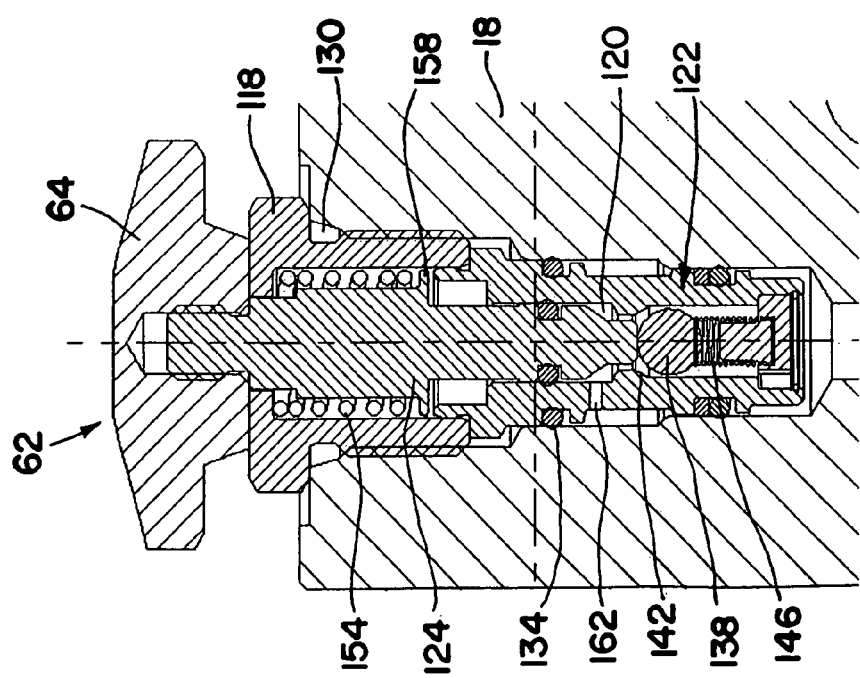
FIG. 8 is a cross-sectional view of the decompression valve assembly in the open position according to the present invention.

Turning now to FIGS. 8 and 9, the decompression valve assembly 62 includes a valve body 118 including a valve passage 120, a check valve 122, and an actuator, e.g., a plunger 124, to which the push-button 64 or other manually activated device is attached. In FIG. 8, the decompression valve assembly 62 is in an open state with the push-button 64 depressed and the check valve 122 open. In the illustrated embodiment, the decompression valve assembly 62 is configured as an insert that can be threaded into a valve port 130 in the manifold body 18. O-rings 134 or other suitable sealing members may be provided to seal an outer circumference of the valve body 118 to the valve port 130 of the manifold as shown.

The check valve 122 is preferably a hard seat check valve. The check valve 122 includes a valve sealing member, such as a ball valve 138, and a valve seat 142. The ball valve 138 is biased closed by a spring 146 or other suitable biasing means.

The valve plunger 124 is supported for axial movement within the valve body 118. The valve plunger is biased by a spring 154 or other biasing means from a valve closed position (FIG. 9) to a valve open position (FIG. 8). In its valve open position, the inner end of the plunger 124 extends through the valve seat 142 to unseat the ball valve 138. The force exerted by the spring 154 on the plunger 124 is greater than the force exerted by the spring 146 on the ball valve 138, whereby the check valve 122 is normally held open in the absence of fluid pressure.

The inner end face of the valve plunger 124 is exposed to fluid pressure in the valve passage 120. When fluid pressure in the valve passage 120 exceeds the biasing force acting on the plunger 124, the plunger 124 will shift to its valve closed position, allowing the valve ball 138 to seal against the valve seat 142, thereby blocking flow from the chamber 82 to the bleed passage 94. The valve ball 138 will remain seated as long as the pressure exceeds the spring force. The pressure at which the check valve 122 closes can be varied as desired by changing either one or both of the springs 146 and 154.

If either of the high pressure supply/return lines is pressurized, the valve ball 138 will be forced close thereby to route full fluid flow to the attachment. To facilitate connection and disconnection of an attachment, the pressure in the supply/return lines can be bled off by depressing the push-button 64, thereby moving the plunger 124 to its valve open position, thereby unseating the check valve 122 and allowing fluid to flow into the passage 120 which is connected to the bleed passage 94.

The bleed passage 94 preferably is provided with a flow restrictor, such as orifice 162. The orifice 162 functions to meter or throttle flow through the bleed passage 94 thereby to avoid a rapid discharge of fluid from the high pressure flow passages 78a and 78b.

The orifice 162 also provides a velocity fuse function. If the flow rate surges or otherwise exceeds a desired level, back pressure generated by the orifice flow acts on the plunger 124 and if sufficiently great will cause the plunger 124 to shift to its valve closed position, thereby allowing the ball valve 138 to close against the seat 142 and stop the flow of fluid from either high pressure passage 78a and/or 78b. The check valve 122 will remain closed by the trapped pressure in the chamber 82 until the plunger button 64 is again depressed. The size of the orifice 162 and the force applied to the valve plunger 124 by the valve plunger spring 154 can be adjusted as desired to set the flow rate at which the check valve 122 will automatically close.

As should now be apparent, the manifold/coupling system 18 can be used to release pressure from the high pressure lines of the system 10 to facilitate connection and disconnection of an attachment. In general, connecting and disconnecting of attachments is done with the pump deactivated or otherwise off-line. To release pressure from the hydraulic system 10, the push-button 64 of the decompression valve assembly 62 is depressed. The check valve 122 is thereby forced open allowing flow from the common chamber 82 to the bleed passage 94. The directional nature of the check valves 86a and 86b in the pilot pressure ports 74a and 74b allow pressure in either of the high pressure lines to be vented to the common chamber 82 and further into the bleed line 58. Once the pressure in the common chamber 82 drops to a level less than the plunger spring bias load, the plunger spring 154 will maintain the check valve 122 in its open position without assistance from the operator, thereby freeing the operator's hands to disconnect and/or connect the hydraulic lines. Once the auxiliary circuit is depressurized, the existing attachment's hydraulic lines can be easily disconnected and a new attachment's hydraulic lines can be connected.

As pressure is being vented, the orifice 162 will serve to meter the rate of flow of fluid from the high pressure lines. This can prevent undesirable rapid release of pressure that may cause damage to the attachment 22 and/or system 10. For example, when the coupling system 16 is used with a top loader attachment and the top loader attachment is in a raised position, the bucket will drop at a controlled rate as pressure in the auxiliary circuit is bled away.

In addition to providing metered bleed flow, the system 16 also has a velocity fuse feature. If the flow velocity exceeds a predetermined level which could allow the bucket to drop abruptly and cause damage to the attachment and/or surrounding objects, back pressure generated upstream of the orifice 162 will cause the plunger 124 to move to its valve closed position, thereby allowing the check valve 122 to close and shut off bleed flow. This will stop further descent of the bucket until the push-button 64 is again depressed.

It will also be appreciated that the coupling system 18 can also automatically release pressure from the auxiliary circuit 10. When the pressure in the chamber 120 drops below a predetermined level, the valve plunger spring 154 forces the valve plunger 124 to its open position thereby opening the check valve 122. Pressure from the high pressure supply/ return passages and lines is thereby automatically released therefrom. The decompression valve assembly 62 will continue to vent the high pressure hydraulic lines to the bleed line, thereby preventing pressure buildup in the auxiliary circuit. Consequently, any pressure increase arising from thermal or other expansion of the fluid in the auxiliary circuit will be dissipated.

It will be appreciated that the automatic venting feature of the decompression valve assembly 62 can allow an operator to connect and disconnect lines of an attachment without manually operating the decompression valve assembly 62. For example, in some applications it is possible to configure the decompression valve assembly 62 to automatically open at a pressure corresponding to a particular position of an attachment. In the case of a top loader attachment, the decompression valve 62 can be configured to automatically open at a pressure corresponding to the bucket of the attachment being in a fully lowered position. Thus, an operator can lower the attachment to the fully lowered position whereat the decompression valve assembly 62 automatically releases pressure from the lines and the attachment can be disconnected from the auxiliary circuit.

After disconnecting an attachment and reconnecting a new attachment, the pump 14 can be activated or otherwise brought online to once again supply high pressure fluid to the high pressure lines. When the auxiliary hydraulic system 10 is re-pressurized, the high pressure flow from the pump 14 surges past the check valves 86a and 86b in the pilot pressure ports 74a and 74b and into the common chamber 82 and decompression valve passage 120. As the fluid flows from the decompression valve passage 120 to the bleed passage 94, back pressure generated by the orifice 162 will cause the valve plunger 124 to shift away from the ball valve 138 and allow the ball valve to seal against the valve seat 142. Once the check valve 122 is closed, the bleed passage 94 is isolated from the high pressure supply/return passages, thereby preventing system energy losses.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A coupling system comprising:
    at least one high pressure flow passage;
    a bleed passage;
    a check valve that when open and closed respectively permits and blocks flow of fluid from the high pressure flow passage through the bleed passage; and
    an actuator normally biased to a valve open position at which the actuator prevents the check valve from closing, and the actuator being movable to a valve closed position allowing the check valve to close when pressure in the bleed passage exceeds a valve close level.

2. A coupling system according to claim 1, wherein the actuator is manually operable to open the check valve when held closed by pressure in the high pressure flow passage.

3. A coupling system according to claim 1, comprising a flow restrictor in the bleed passage downstream of the check valve for restricting flow through the bleed passage and for generating back pressure upstream of the flow restrictor; and wherein the actuator is moved to its valve closed position in response to the back pressure exceeding the valve close level.

4. A coupling system according to claim 3, wherein the actuator is manually operable to open the check valve when held closed by pressure in the high pressure flow passage.

5. A coupling system according to claim 3, wherein the check valve has a valve seat and a valve sealing member for sealing against the valve seat, and the actuator includes an axially movable plunger resiliently biased from a valve closed position allowing the valve sealing member to seal against the valve seat to a valve open position displacing the valve sealing member away from the valve seat thereby to allow flow of fluid through the check valve.

6. A coupling system according to claim 5, wherein the plunger is resiliently biased by a first biasing force from its valve closed position to its valve open position, and the valve sealing member is resiliently biased by a second biasing force towards the valve seat, and the second biasing force is less than the first biasing force whereupon the check valve is normally open.

7. A coupling system as set forth in claim 3, wherein the high pressure flow passage, bleed passage, check valve, actuator and flow restrictor are located in a manifold block.

8. A coupling system according to claim 3, comprising a quick-disconnect coupler half in communication with the high pressure flow passage, which quick-disconnect coupler half is configured to connect with a mating coupler half to establish a fluid connection therebetween.

9. A coupling system according to claim 8, comprising a quick-disconnect coupler half in communication with the bleed passage downstream of the flow restrictor, which quick-disconnect coupler half is configured to connect with a mating coupler half to establish a fluid connection therebetween.

10. A coupling system according to claim 3, wherein said at least one high flow passage includes first and second high pressure flow passages, and the bleed passage is connected to the first and second high pressure flow passages for common decompression of both high pressure flow passages.

11. A coupling system according to claim 3, wherein the flow restrictor includes an orifice.

12. A coupling system comprising:
    first and second coupler halves configured to connect with respective mating coupler halves;

a chamber connecting at least one of the first and second coupler halves to a drain line coupler; and
a decompression valve assembly configured to control flow from the chamber to the drain line coupler, the decompression valve assembly including:
a check valve that when open and closed respectively permits and blocks flow of fluid from the respective coupler half to the drain line coupler,
an orifice downstream of the check valve for metering flow from the chamber to the drain line coupler, and
an open biased plunger configured to force open the check valve when in a valve open position, and to automatically shift to a valve closed position when pressure in the chamber exceeds a predetermined level.

13. A coupling system according to claim 12, wherein the check valve is a hard seat check valve.

14. A coupling system according to claim 12, wherein the plunger is manually movable from its valve closed position to its valve open position.

15. A coupling system according to claim 14, wherein the plunger has a push button for effecting such manual movement.

* * * * *